United States Patent
Ozimek et al.

(10) Patent No.: US 11,070,055 B2
(45) Date of Patent: *Jul. 20, 2021

(54) METHOD AND APPARATUS FOR INCREASING CURRENT CAPACITY OF A DISTRIBUTED DRIVE SYSTEM

(71) Applicant: Rockwell Automation Technologies, Inc., Mayfield Heights, OH (US)

(72) Inventors: Patrick Ozimek, Wauwatosa, WI (US); John Balcerak, Muskego, WI (US); Jeremiah Kopiness, Saukville, WI (US); Vinod Bhansali, Germantown, WI (US); Shailendra Shukla, Airoli Navi Mumbai (IN); Magesh Subbarao Rengabashyam, Bangalore (IN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,423

(22) Filed: May 26, 2020

(65) Prior Publication Data

US 2020/0281586 A1    Sep. 10, 2020

Related U.S. Application Data

(60) Division of application No. 15/869,362, filed on Jan. 12, 2018, now Pat. No. 10,695,054, which is a (Continued)

(30) Foreign Application Priority Data

May 14, 2015  (IN) ............................ 1357/DEL/2015

(51) Int. Cl.
*H02J 1/12* (2006.01)
*H02J 1/10* (2006.01)
(Continued)

(52) U.S. Cl.
CPC ............ *H02J 1/102* (2013.01); *H02J 7/0042* (2013.01); *H02J 7/345* (2013.01)

(58) Field of Classification Search
CPC ........... H02J 7/0042; H02J 1/102; H02J 7/345
(Continued)

(56) References Cited

U.S. PATENT DOCUMENTS 4,195,194 A    3/1980  Kuster et al.
4,423,917 A    1/1984  Scheingold et al.
(Continued)

FOREIGN PATENT DOCUMENTS

EP        1998407 A2    12/2008

OTHER PUBLICATIONS

Tyco Electronics, 114-19128; Dec. 2010—(8) pages.
(Continued)

*Primary Examiner* — Ryan Jager
(74) *Attorney, Agent, or Firm* — Boyle Fredrickson, SC

(57) ABSTRACT

An improved system for connecting a DC bus cable and a remote motor drive includes a capacitance module and an extension module that may each be mounted adjacent to the remote motor drive. The capacitance module includes a first DC bus connector and a second DC bus connector. The first DC bus connector includes a terminal block configured to receive a pair of conductors for the DC bus. The first DC bus connector further includes a pair of intermediate bus bars where each of the intermediate bus bars are connected at a first end to the terminal block and at a second end to a circuit board contained within the capacitance module. Traces on the circuit board are routed between the second ends of the intermediate bus bars and the second DC bus connector. The second DC bus connector is configured to be connected to DC bus bars.

20 Claims, 12 Drawing Sheets

Related U.S. Application Data continuation of application No. 14/947,268, filed on Nov. 20, 2015, now Pat. No. 9,882,421.

(51) Int. Cl.
*H02J 7/34* (2006.01)
*H02J 7/00* (2006.01)

(58) Field of Classification Search
USPC ......................................................... 307/109
See application file for complete search history.

(56) References Cited

U.S. PATENT DOCUMENTS

| | | | |
|---|---|---|---|
| 4,475,781 A | 10/1984 | Asick et al. | |
| 4,721,471 A | 1/1988 | Mueller | |
| 5,024,627 A | 6/1991 | Bennett et al. | |
| 5,073,120 A | 12/1991 | Lincoln et al. | |
| 5,132,896 A * | 7/1992 | Nishizawa | H01G 11/82 |
| | | | 363/144 |
| 5,203,724 A | 4/1993 | Casey | |
| 5,252,086 A | 10/1993 | Russell et al. | |
| 5,365,424 A * | 11/1994 | Deam | H01L 23/52 |
| | | | 174/72 B |
| 5,670,743 A | 9/1997 | Welch et al. | |
| 6,066,921 A | 5/2000 | Nakamura et al. | |
| 6,201,350 B1 | 3/2001 | Okuchi et al. | |
| 7,053,302 B2 | 5/2006 | Bjorklund et al. | |
| 7,527,523 B2 | 5/2009 | Yohn et al. | |
| 7,905,737 B2 | 3/2011 | Byrne | |
| 8,686,288 B2 | 4/2014 | Kalayjian et al. | |
| 8,811,050 B2 | 8/2014 | Hotta et al. | |
| 8,947,899 B2 | 2/2015 | Savatski et al. | |
| 9,093,804 B2 | 7/2015 | Matocky et al. | |
| 2008/0105476 A1 | 5/2008 | Korich et al. | |
| 2009/0015992 A1 | 1/2009 | Nohara et al. | |
| 2009/0047814 A1 | 2/2009 | Daamen | |
| 2010/0062627 A1 | 3/2010 | Ambo et al. | |
| 2011/0261508 A1 | 10/2011 | Ross et al. | |
| 2012/0264317 A1 | 10/2012 | Balcerak et al. | |
| 2013/0012072 A1 | 1/2013 | Costello et al. | |
| 2013/0119902 A1 * | 5/2013 | Gries | H02P 5/74 |
| | | | 318/400.3 |
| 2013/0322141 A1 | 12/2013 | Kobayashi et al. | |
| 2014/0320048 A1 | 10/2014 | Vrankovic et al. | |
| 2014/0361613 A1 * | 12/2014 | Huang | H02M 7/493 |
| | | | 307/12 |
| 2016/0336795 A1 * | 11/2016 | Ozimek | A61B 17/07207 |

OTHER PUBLICATIONS

Tyco Electronics, Crown Clip Junior. Catalog 1654261-8; Sep. 2008—(8) pages.
Extended European Search Report (EESR) dated Feb. 26, 2015; European Patent Application No. 14187273.9—(5) pages.

\* cited by examiner

METHOD AND APPARATUS FOR INCREASING CURRENT CAPACITY OF A DISTRIBUTED DRIVE SYSTEM

CROSS-REFERENCE TO RELATED APPLICATIONS

This application is a divisional of and claims priority to U.S. application Ser. No. 15/869,362, filed Jan. 12, 2018, which, in turn, is a continuation of and claims priority to U.S. application Ser. No. 14/947,268, filed Nov. 20, 2015 and issued Jan. 30, 2018 as U.S. Pat. No. 9,882,421, which, in turn, claims priority to Indian patent application No. 1357/DEL/2015, filed May 14, 2015, the entire contents of each application is incorporated herein by reference.

BACKGROUND OF THE INVENTION

The subject matter disclosed herein relates generally to a system for increasing the current capacity of a distributed motor drive system and, more specifically, to a capacitance module and an extension module mountable proximate to an inverter in the distributed motor drive system.

As is known to those skilled in the art, a motor drive is used to convert energy from a first form to a second form. The input voltage may be a DC voltage having a fixed amplitude or a single phase or multi-phase AC voltage having a fixed amplitude and frequency. The output voltage may be an AC voltage having a variable frequency and/or amplitude, where the motor drive controls the frequency and amplitude supplied to the motor such that the motor rotates at a desired speed or produces a desired torque. According to one common configuration, the motor drive includes a front end, configured to convert an AC input voltage to a DC voltage present on a DC bus, and an inverter, configured to convert the DC voltage from the DC bus to the AC voltage provided to the motor.

Some controlled systems, such as a process line or a machining center, may include multiple motors, each controlling a different axis of motion. The controlled system receives AC power from the utility grid, which is, in turn distributed to each of the motors. It may be advantageous to provide a single AC-to-DC converter, or rectifier, having a power rating sufficient to provide power for all of the motors in the controlled system, to convert the AC power to DC power for distribution via a shared DC bus. Although the single rectifier module may require more space due to its power rating than a rectifier sized for one of the motors, the overall space required may be reduced by not requiring a separate rectifier for each motor. Each motor may then have an associated motor drive which includes an inverter connected to the shared DC bus. The motor drive controls operation of the inverter to provide AC power to the motor to achieve a desired operation of the motor. Each motor drive may be mounted proximate to the rectifier module or, optionally, may be distributed about the controlled system proximate to the motor being controlled by the motor drive.

However, shared DC bus systems have not been fully met without incurring various disadvantages. Because the DC bus is shared between inverters, the conductors, or at least a portion of the conductors, for the DC bus must be sized to handle the total current capacity of all inverters connected to the DC bus. If an inverter is located adjacent to the rectifier module, a DC bus bar may be used to connect the two modules. The bus bar is a preformed, rigid conductor having a fixed routing path, often linear, between the two modules and is often rigidly connected to each module. Such connection may be suitable for adjacent modules. If, however, an inverter is located remotely from the rectifier module, it typically requires a DC bus cable. A DC bus cable may be routed in a flexible manner as required between modules. Increased current capacity in a DC bus cable is obtained by utilizing a larger wire gauge. However, as the wire gauge for the DC bus cable increases, the weight of the cable similarly increases and flexibility for routing is reduced. The increased weight and reduced flexibility of the cable generates increased strain on the connector for the motor drive to which the DC bus cable is connected. The physical limitations on connecting the DC bus cable to the motor drive may restrict the current rating for a shared DC bus and, therefore, restrict the number of motor drives that may be connected to the shared DC bus.

Thus, it would be desirable to provide an improved connector between a DC bus cable and motor drive to provide increased current capacity on the shared DC bus.

As is known in the art, motor drives typically include a capacitance connected in parallel across the DC bus. The capacitance helps reduce the magnitude of ripple on the DC bus resulting from converting the AC voltage to a DC voltage and helps maintain a constant amplitude of voltage on the DC bus. The capacitance additionally acts to reduce ripple voltage on the DC bus resulting from the controlled switching within the inverter to convert the DC voltage to the desired AC voltage waveform. In a motor drive that includes both the rectifier and the inverter, each motor drive also includes a DC bus capacitance typically within the motor drive. However, in the shared DC bus system, the majority of the DC bus capacitance may be located in the rectifier module. The individual motor drives typically have a nominal capacitance and rely primarily on the capacitance in the rectifier module to reduce the ripple voltage on the DC bus resulting from the switching in each motor drive.

As previously indicated, when a motor drive is located remotely from the rectifier module, a DC bus cable typically connects the shared DC bus between the rectifier module and the motor drive. However, inductance in the DC bus cable isolates the motor drive from the capacitance in the rectifier module. As the distance of the DC bus cable increases, the inductance in the DC bus cable similarly increases. The increased inductance creates greater isolation of the motor drives from the capacitance in the rectifier module. As a result, an increase in ripple current and/or harmonic content at the switching frequency or multiples of the switching frequency for the motor drive is present on the shared DC bus. These undesirable current components limit the amplitude of desirable DC bus current that may be conducted on the DC bus cable without exceeding the current rating for the DC bus cable and will reduce the life of the capacitors connected to the DC bus, potentially resulting in premature failure of a motor drive.

Thus, it would be desirable to provide a system that reduced the ripple and/or harmonic current present on the DC bus as a result of inverter switching.

BRIEF DESCRIPTION OF THE INVENTION

The subject matter disclosed herein describes an improved system for connecting a DC bus cable to a module in a distributed motor drive system and further describes an improved system for reducing the ripple and/or harmonic current present on the DC bus as a result of inverter switching. A capacitance module is provided that may be mounted adjacent to one or more remote motor drives. The capacitance module includes a housing, a first DC bus connector, and a second DC bus connector. A portion of the first DC bus connector either extends outside the housing or is accessible via an opening in the housing. The portion of the first DC bus connector accessible from outside the housing includes a terminal block with wire terminals configured to receive conductors in a DC bus cable. According to one embodiment of the invention, the terminal block includes a pair of wire terminals and each wire terminal is a mounting bolt. The DC bus cable includes two conductors, one for the positive rail and one for the negative rail of the DC bus. Each conductor is terminated with a lug configured to be secured to one of the mounting bolts. The first DC bus connector further includes a pair of intermediate bus bars where each of the intermediate bus bars are connected at a first end to one of the mounting bolts and at a second end to a circuit board contained within the housing of the capacitance module. Traces on the circuit board are routed between the second ends of the intermediate bus bars and the second DC bus connector. The second DC bus connector includes slots configured to receive DC bus bars. DC bus bars are inserted into the slot and run between the capacitance module and the one or more remote motor drives adjacent to the capacitance module. The first DC bus connector may also include a support member. The support member provides additional stability between the mounting bolts and the circuit board to resist rotational and/or lateral forces applied to the mounting bolts, for example, while securing the lugs to the mounting bolts or from the weight of the DC bus cable. A capacitance is connected in parallel to the traces on the circuit board providing additional bus capacitance at the remote motor drives.

According to another aspect of the invention, an extension module may be mounted adjacent to the capacitance module. The extension module also includes a housing, a first DC bus connector and a second DC bus connector. The first and second DC bus connectors are the same as the first and second DC bus connectors on the capacitance module. A pair of flexible DC bus links is mounted between each wire terminal on the first DC bus connector of the capacitance module and the corresponding wire terminal on the first DC bus connector of the extension module. The DC bus cable is then mounted to the extension module. DC bus bars are inserted into the slots of both the capacitance module and the extension module as well as slots on DC bus connectors of each adjacent motor drive. The extension module, therefore, provides a parallel conduction path with the capacitance module between the DC bus cable and the DC bus bars and doubles the current capacity of the connection between the DC bus cable and the DC bus bars with the capacitance module alone.

According to on embodiment of the invention, an apparatus for reducing ripple current on a shared DC bus in a distributed motor drive system is disclosed, where the distributed motor drive system includes multiple motor drives, each connected to the shared DC bus, and the DC bus includes a set of DC bus wires extending between at least a first portion of the motor drives and a second portion of the motor drives. The apparatus includes a first capacitance module mounted adjacent to the first portion of the motor drives and a second capacitance module mounted adjacent to the second portion of the motor drives. The first capacitance module includes a first set of terminals configured to receive a DC bus voltage via a first set of DC bus bars from a motor drive in the first portion of the motor drives, a second set of terminals configured to provide the DC bus voltage to the set of DC bus wires, and a first internal DC bus electrically connected in series between the first set of terminals and the second set of terminals. The second capacitance module includes a third set of terminals configured to receive the DC bus voltage from the set of DC bus wires, a fourth set of terminals configured to provide the DC bus voltage to a motor drive in the second portion of the motor drives via a second set of DC bus bars, and a second internal DC bus electrically connected in series between the third set of terminals and the fourth set of terminals.

According to another embodiment of the invention, an apparatus for reducing ripple current on a shared DC bus in a distributed motor drive system is disclosed, where the distributed motor drive system includes multiple motor drives, each connected to the shared DC bus, and the DC bus includes a set of DC bus wires extending between at least a first portion of the motor drives and a second portion of the motor drives. The apparatus includes a first module mounted proximate to the first portion of the plurality of motor drives and a second module mounted proximate to the second portion of the plurality of motor drives. The first module includes a first set of terminals configured to receive a DC bus voltage via a first set of DC bus bars from a motor drive in the first portion of the motor drives, a second set of terminals configured to provide the DC bus voltage to the set of DC bus wires, and a first internal DC bus electrically connected in series between the first set of terminals and the second set of terminals. The second module includes a third set of terminals configured to receive the DC bus voltage from the set of DC bus wires, a fourth set of terminals configured to provide the DC bus voltage to a motor drive in the second portion of the motor drives via a second set of DC bus bars, and a second internal DC bus electrically connected in series between the third set of terminals and the fourth set of terminals.

According to yet another embodiment of the invention, a DC bus connector system for distributed motor drives includes a first set of DC bus bars defining a first portion of a shared DC bus, where the first portion of the shared DC bus supplies power to a first portion of distributed motor drives. A first module is configured to be mounted proximate to the first portion of distributed motor drives. The first module includes a first set of terminals configured to receive a DC bus voltage from the first set of DC bus bars, a second set of terminals configured to be connected to a third set of terminals via a set of DC bus wires, and a first internal DC bus electrically connected in series between the first set of terminals and the second set of terminals. A second internal DC bus is configured to be electrically connected between the third set of terminals and a fourth set of terminals, and a second set of DC bus bars defines a second portion of the shared DC bus. The second portion of the shared DC bus supplies power to a second portion of distributed motor drives, and the first internal DC bus is configured to provide the DC bus voltage from the first set of terminals to the DC bus wires via the second set of terminals. The set of DC bus wires is configured to provide the DC bus voltage from the second set of terminals to the third set of terminals, and the second internal DC bus is configured to provide the DC bus voltage from the third set of terminals to the second set of DC bus bars via the fourth set of terminals.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
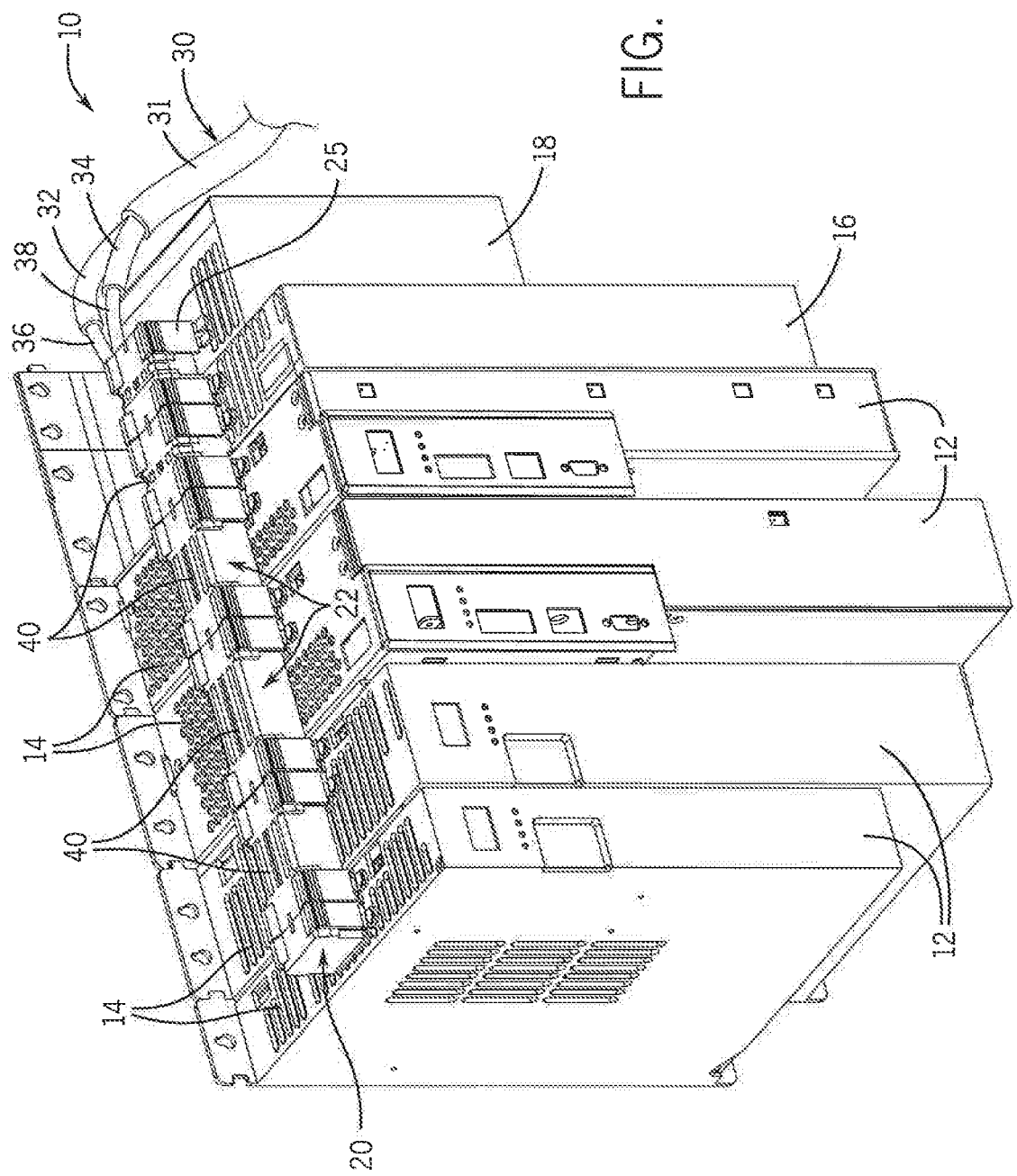
FIG. 1 is an isometric view of an exemplary multi-axis drive system incorporating a capacitance module and an extension module according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 2:
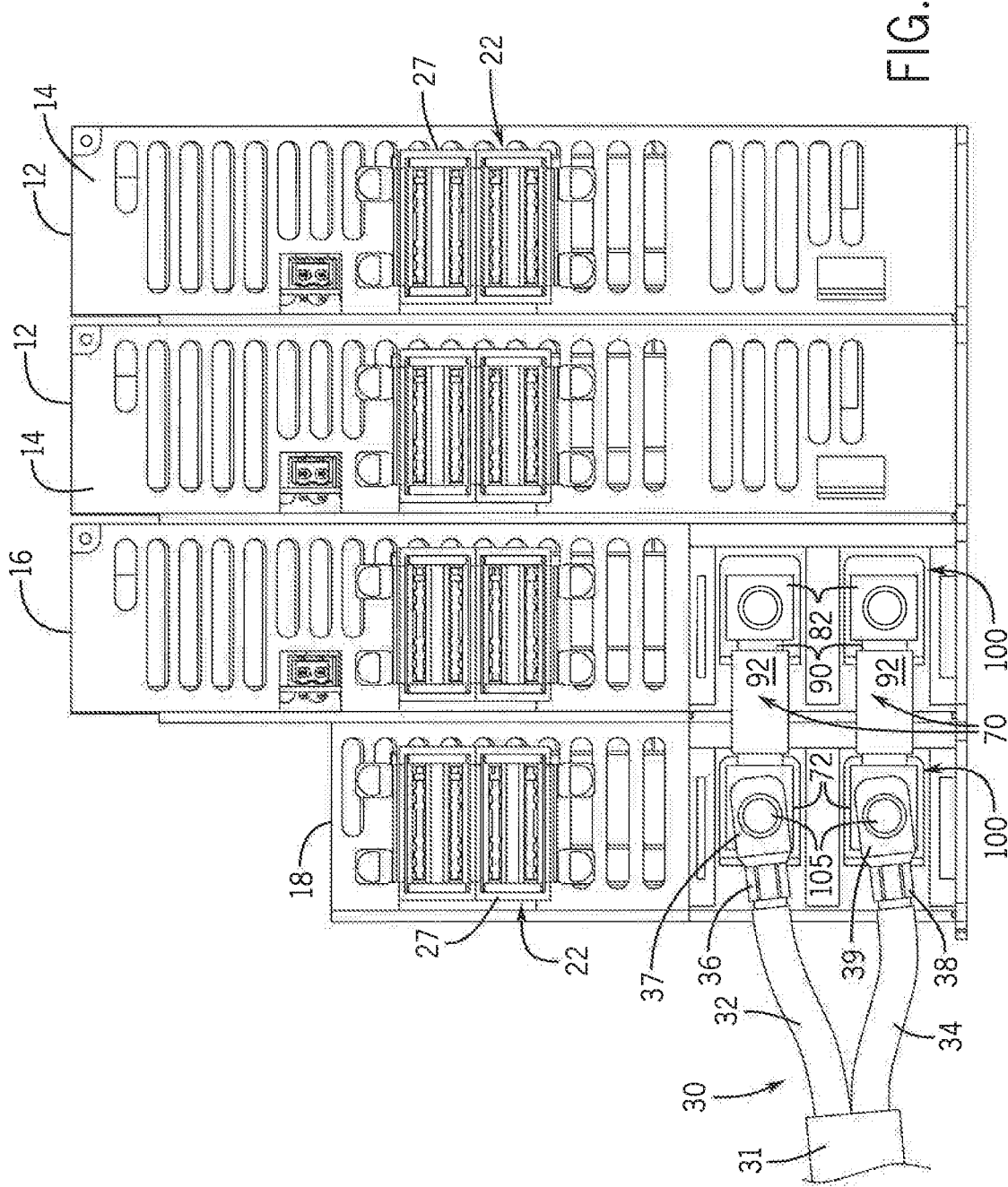
FIG. 2 is a partial top plan view of the exemplary multi-axis drive system, capacitance module, and extension module from FIG. 1.
Figure 3:
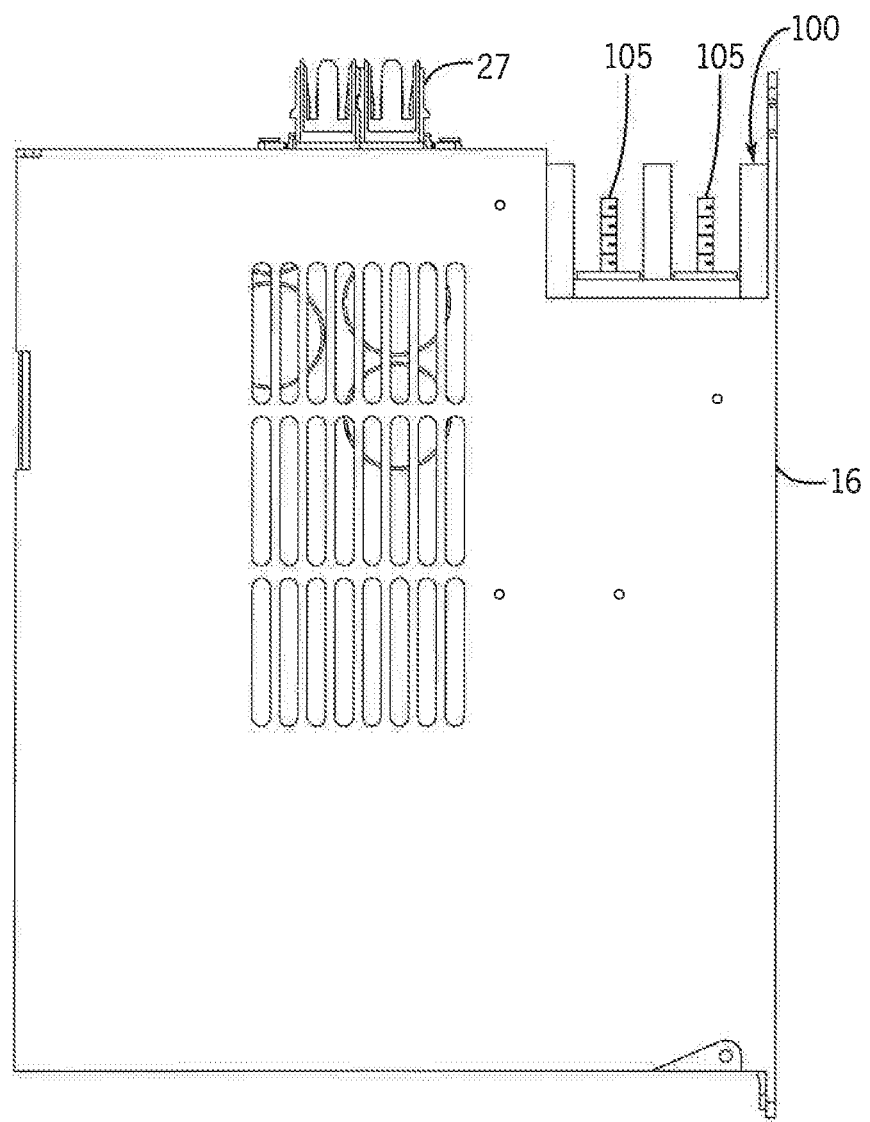
FIG. 3 is a side elevation view of the capacitance module of FIG. 1.

Turning initially to FIGS. 1-3, an exemplary multi-axis drive system 10 utilizing a shared DC bus 20 is illustrated. The multi-axis drive system 10 includes multiple modules, such as motor drives 12, a capacitance module 16, and an extension module 18. Each motor drive 12 may be configured to control operation of one motor, or axis, of the multi-axis drive system 10. Each motor drive 12 may include, for example, an inverter to convert a DC voltage to an AC voltage, a rectifier to convert an AC voltage to a DC voltage, a converter to convert a DC voltage at a first voltage potential to a DC voltage at a second voltage potential, or a combination thereof. According to the illustrated embodiment, each motor drive 12 receives power from the shared DC bus 20 and includes an inverter operable to convert the power received from the shared DC bus 20 to a desired AC voltage to control operation of a motor (not shown) connected to the motor drive 12.

The shared DC bus 20 is connected to a remote power source, such as a regenerative module 13 or a rectifier module 15 (see e.g., FIGS. 6-9) via a DC bus cable 30. The DC bus cable 30 includes a first conductor 32 and a second conductor 34 contained within an insulated cable jacket 31 or sheath. A first lug 36 is connected to the end of the first conductor 32 and a second lug 38 is connected to the end of the second conductor 34. Each lug 36, 38 may be connected to the respective conductor 32, 34 by crimping, soldering, or any other suitable method. Each lug 36, 38 includes a first mating member 37, 39 operable to engage a complementary mating member mounted to the extension module 18. According to the illustrated embodiment, the first mating member 37, 39 is a generally planar surface with a hole extending through the planar surface. The complementary mating member is a threaded rod, such as a mounting bolt 105 on a DC bus connector 100 (see e.g., FIG. 3). The hole in the planar surface is placed over the mounting bolt and a nut is then threaded on to the mounting bolt to secure the lug 36, 38 to the DC bus connector 100.

Figure 4:
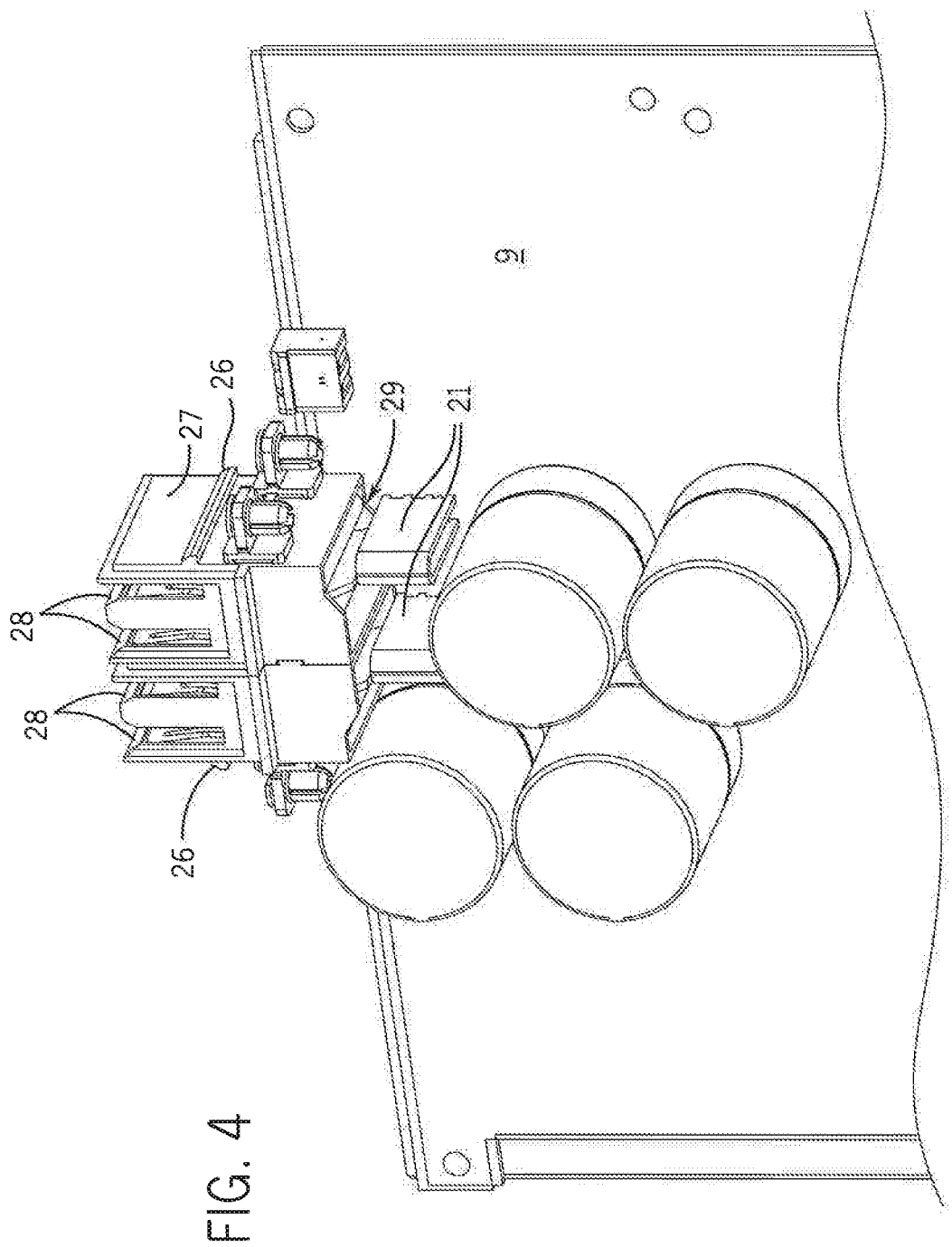
FIG. 4 is an isometric view of a circuit board from the motor drive of FIG. 1 with a DC bus stab and the bus connector mounted thereto.

A connector system 22 for the multi-axis drive system 10 includes a bus bar assembly 40 and a bus bar connector 27 on each motor drive 12. The connector system 22 allows for a fast, modular connection of the shared DC bus 20 between modules 12, 16, 18. According to the illustrated embodiment, the bus bar connector 27 is mounted to the top surface 14 of each module 12, 16, 18. Optionally, the bus bar connector 27 may be connected to another surface of the modules 12, 16, 18 such as the front, rear, or lower surface as long the surfaces of adjacent modules 12, 16, 18 on which the bus bar connector 27 is mounted are substantially in the same geometric plane. With reference also to FIG. 4, the bus bar connector 27 includes at least one external slot 28 with an opening external to the module 12, 16, 18, where each external slot 28 is configured to receive a bus bar 60 (see e.g., FIG. 5) within the slot 28. The bus bar connector 27 further includes at least one internal slot 29 with an opening internal to the module 12, 16, 18, where each internal slot 29 is configured to engage a DC bus stab 21 mounted to a circuit board 9 within the module 12, 16, 18.

Figure 5:
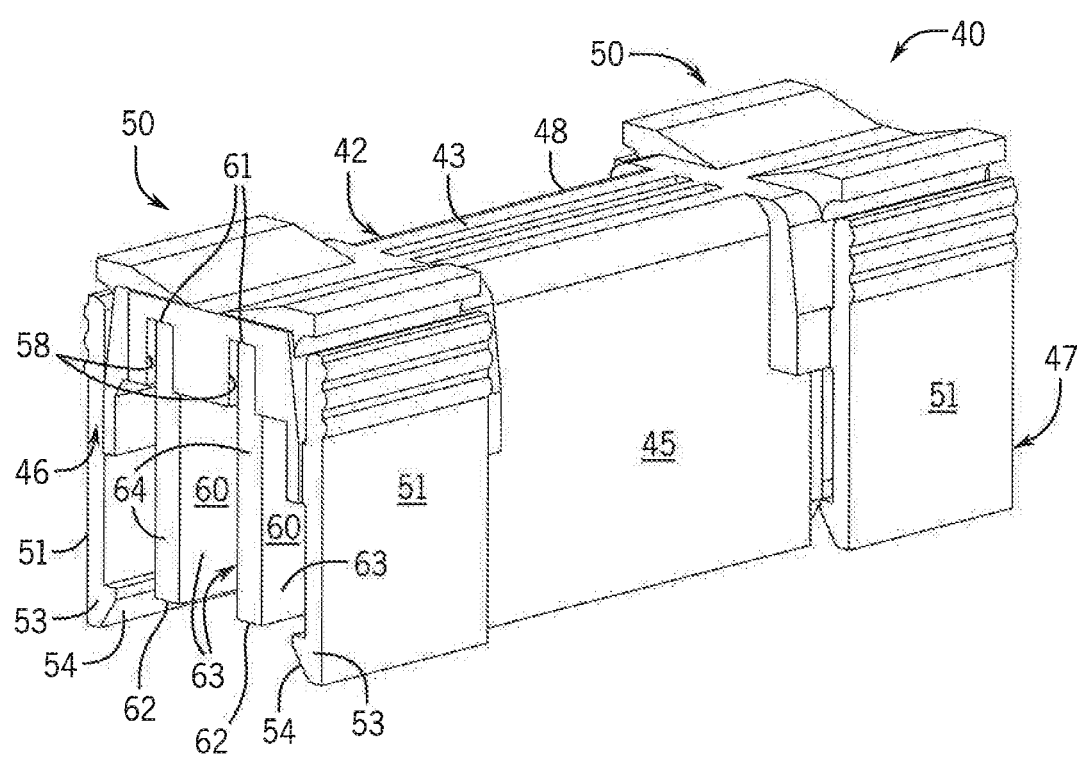
FIG. 5 an isometric view of a bus bar assembly for the shared DC bus according to one embodiment of the invention.

The connector system 22 also includes a bus bar assembly 40 used to establish an electrical connection between bus bar connectors 27 on adjacent module 12, 16, 18. Turning next to FIG. 5, a bus bar assembly 40 according to one embodiment of the invention is illustrated. The bus bar assembly 40 includes a housing 42 and at least one bus bar 60. The housing 42 is a generally "u" shaped member having an upper wall 43, a pair of side walls 45, a first end 46, and a second end 47. A clip portion 50 is integrally formed in the housing 42 on each side and at each of the first end 46 and the second end 47 of the housing 42. Each side wall 45 is joined to the upper wall 43 along an upper edge 48 of the housing 42 and extends longitudinally between clip portions 50 at each end 46, 47 of the housing 42. The clip portion 50 includes an arm 51 pivotally mounted to and extending downward from the upper edge 48 of the housing 42. According to the illustrated embodiment, the arm 51 is integrally formed with the housing 42 of a resilient material allowing the lower edge of the arm 51 to pivot about the edge 48 and return to its original position. The inner face of the arm 51 includes a retaining tab 53 extending longitudinally along the inner face of the arm 51 and proximate to the lower edge of the arm 51. The retaining tab 53 projects inward into the housing 42 and includes a beveled surface 54 sloped outward and downward from the inner face of the retaining tab 53. The beveled surface 54 of the retaining tab 53 on the clip 50 is complementary to a beveled outer edge of a retaining member 26 on the bus bar connector 27. The housing 42 also includes at least one slot 58 configured to receive the bus bars 60. The slots 58 establish a friction fit between each bus bar 60 and the housing 42. The housing 42 may further include one or more bus bar retaining members (not shown) that extend around the periphery of the bus bar 60. The bus bar retaining member further defines the slot 58 in which each bus bar 60 is received. Separate bus bar retaining members may be located proximate to each end 46, 47 of the housing 42 or a single bus bar retaining member may be centrally located within, or extend substantially the length of, the housing 42.

The illustrated embodiment of the bus bar assembly 40 includes two bus bars 60. Optionally, the bus bar assembly 40 may include four bus bars 60 or other numbers of bus bars 60 corresponding to the number of external slots 28 on the bus bar connector 27. Each bus bar 60 is formed of a conductive material, such as copper. Each bus bar 60 has an upper surface 61, a lower surface 62, and a pair of side surfaces 63 each of which extends between opposite ends 64, defining a generally rectangular bar. The height of each side surface 63 is greater than the width of the upper surface 61 and the lower surface 62 and the bus bar 60 extends longitudinally within the housing 42 substantially between the first end 46 and the second end 47 of the housing 42. Each bus bar 60 may be inserted into one of the slots 58 of the housing 42 and be retained by a friction fit and/or and adhesive. Optionally, the housing 42 may be molded over the bus bars 60. The bus bar assembly 40 is used to establish an electrical connection between bus bar connectors 27 on adjacent modules 12, as shown in FIG. 1. A suitable connector system 22 for use with various embodiments of the present invention is disclosed in U.S. patent application Ser. No. 14/046,458, which is owned by Rockwell Automation Technologies, Inc. and which is hereby incorporated by reference.

Figure 6:
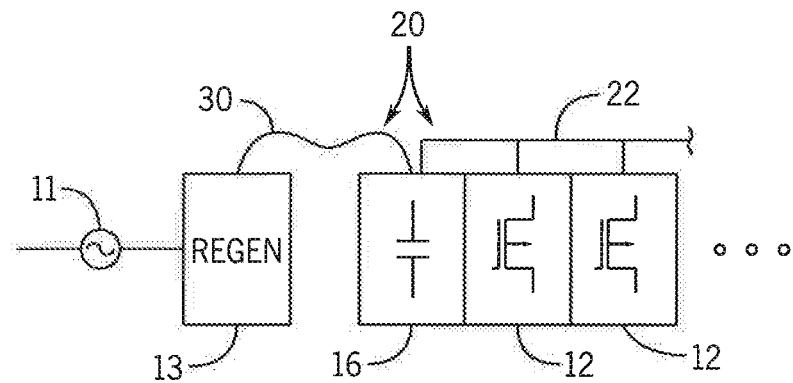
FIG. 6 is a block diagram representation of a first exemplary distributed motor drive system incorporating one embodiment of the invention.

The connector system 22, described above, provides a fast, modular connection of the shared DC bus 20 between modules 12, 16, 18 when the modules 12, 16, 18 are mounted adjacent to each other or spaced apart from each other as long as the bus bar connectors 27 are aligned with each other. However, numerous configurations exist in which at least a portion of the modules are not mounted adjacent to each other or with bus bar connectors 27 aligned to each other. Referring next to FIGS. 6-9 several such configurations are illustrated. In FIG. 6, a regenerative module 13 receives power from an AC source 11. The AC source 11 may be a single phase or multi-phase AC source. The regenerative module 13 includes a set of controlled switches such as solid state devices including, but not limited to, thyristors, silicon controlled rectifiers (SCRs), or transistors to convert the AC power to a DC voltage for the shared DC bus 20. A controller in the regenerative module 13 controls operation of the switches to selectively connect each phase from the AC source 11 to the shared DC bus 20 and, thereby, controls bi-directional current flow between the AC source 11 and the shared DC bus 20. The regenerative module 13 further includes a DC bus capacitance connected between the positive and negative rails of the shared DC bus 20. According to the embodiment illustrated in FIG. 6, a capacitance module 16 and multiple motor drives 12 are located remotely from the regenerative module 13. The remote location may be, for example, within a control cabinet but displaced from the regenerative module 13, within separate control cabinets, or at a location proximate to a controlled axis of motion on a controlled machine or process. In any event, a DC bus cable 30 connects the regenerative module 13 and the capacitance module 16. A first end of the DC bus cable 30 is connected to DC bus terminals on the regenerative module 13, and a second end of the DC bus cable 30 is mounted to the capacitance module 16. The capacitance module 16 also includes a DC bus capacitance connected between the positive and negative rails of the shared DC bus 20. As will be discussed in more detail below, the capacitance module 16 includes a DC bus connector 100 configured to receive the second end of the DC bus cable 30 and establishes an electrical connection between the DC bus cable 30 and the connector system 22. The connector system 22 conducts the DC power on the shared DC bus 20 to each of the motor drives 12.

Figure 7:
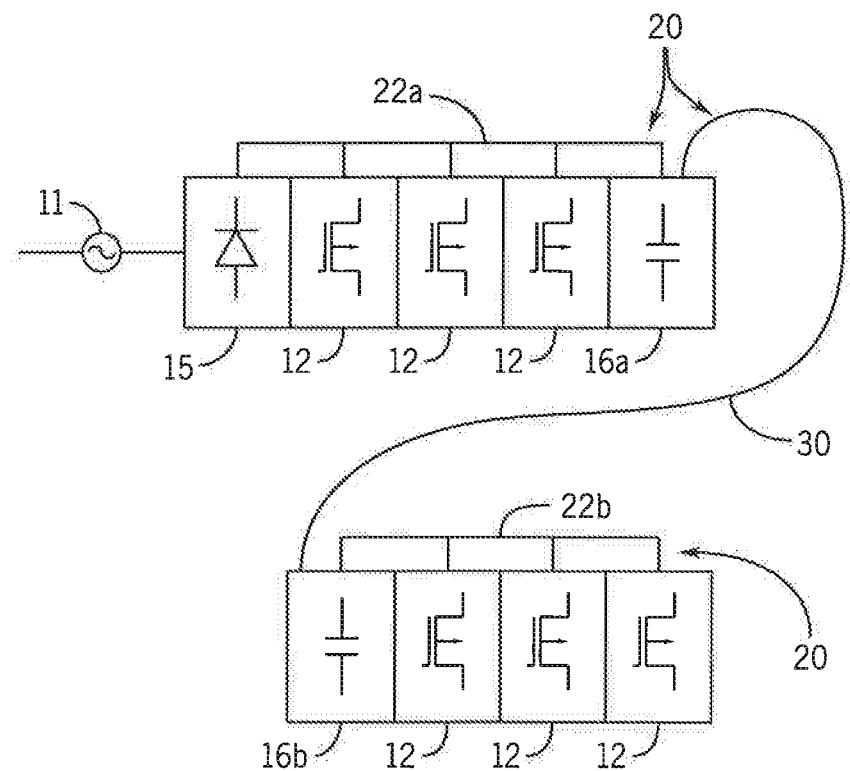
FIG. 7 is a block diagram representation of a second exemplary distributed motor drive system incorporating one embodiment of the invention.

In FIG. 7, a rectifier module 15 receives power from the AC source 11. The AC source 11 may be a single phase or multi-phase AC source. The rectifier module 15 includes a set of diodes, forming a diode bridge, that rectifies the input power from the AC source 11 to a DC voltage on the shared DC bus 20. The rectifier module 15 further includes a DC bus capacitance connected between the positive and negative rails of the shared DC bus 20 The rectifier module 15 conducts current only from the AC source 11 to the shared DC bus 20. According to the embodiment illustrated in FIG. 7, the rectifier module 15 provides DC power to a first series of motor drives 12 via a first connector system 22a. A second series of motor drives, however, are located remotely from the rectifier module 15 and the first series of motor drives 12. The remote location may be, for example, a second row within a control cabinet, a separate control cabinet, or a location proximate to a controlled axis of motion on a controlled machine or process. A first capacitance module 16a is connected at the end of the first series of motor drives 12, and a second capacitance module 16b is connected at the start of the second series of motor drives 12. Each of the capacitance modules 16a, 16b includes a DC bus capacitance connected between the positive and negative rails of the shared DC bus 20. A DC bus cable 30 connects the first and the second capacitance modules 16a, 16b. Each of the capacitance modules 16 includes a DC bus connector 100 and each end of the DC bus cable 30 is connected to the DC bus connector 100 on the respective capacitance module 16. The first capacitance module 16a establishes an electrical connection between the first connector system 22a on the first series of motor drives and the DC bus cable 30. The second capacitance module 16b establishes an electrical connection between the DC bus cable 30 and the second connector system 22b. The second connector system 22b conducts the DC power on the shared DC bus 20 to each of the motor drives 12 in the second series of motor drives.

Figure 8:
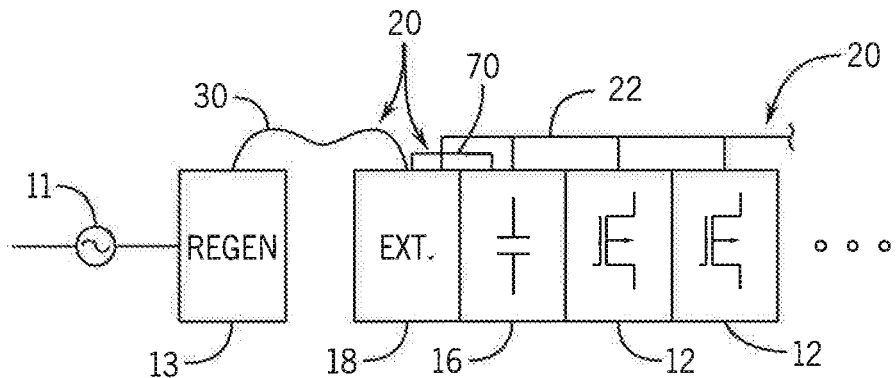
FIG. 8 is a block diagram representation of the first exemplary distributed motor drive system incorporating another embodiment of the invention.

In FIG. 8, another embodiment of the invention is illustrated. A regenerative module 13 again receives power from an AC source 11. Just as in the embodiment illustrated in FIG. 6, the AC source 11 may be a single phase or multi-phase AC source. The regenerative module 13 includes a set of controlled switches such as solid state devices including, but not limited to, thyristors, silicon controlled rectifiers (SCRs), or transistors to convert the AC power to a DC voltage for the shared DC bus 20. A controller in the regenerative module 13 controls operation of the switches to selectively connect each phase from the AC source 11 to the shared DC bus 20 and, thereby, controls bi-directional current flow between the AC source 11 and the shared DC bus 20. According to the embodiment illustrated in FIG. 8, however, an extension module 18 is added in parallel with the capacitance module 16. The extension module 18, capacitance module 16, and multiple motor drives 12 are located remotely from the regenerative module 13. The remote location may be, for example, within a control cabinet but displaced from the regenerative module 13, within separate control cabinets, or at a location proximate to a controlled axis of motion on a controlled machine or process. In any event, a DC bus cable 30 connects the regenerative module 13 and the capacitance module 16. A first end of the DC bus cable 30 is connected to DC bus terminals on the regenerative module 13, and a second end of the DC bus cable 30 is mounted to the extension module 18. The extension module 18 and the capacitance module 16 both include a DC bus connector 100 configured to receive the second end of the DC bus cable 30. The second end of the DC bus cable 30 is connected to the DC bus connector 100 of the extension module 18, and the two DC bus connectors 100 are connected by a flexible bus link 70 (see e.g., FIG. 2). Thus, the DC power conducted via the shared DC bus 20 is conducted from the DC bus cable 30 through both DC bus connectors 100. Each DC bus connector 100 establishes an electrical connection between the DC bus cable 30 and the connector system 22. The connector system 22 conducts the DC power on the shared DC bus 20 to each of the motor drives 12.

Figure 9:
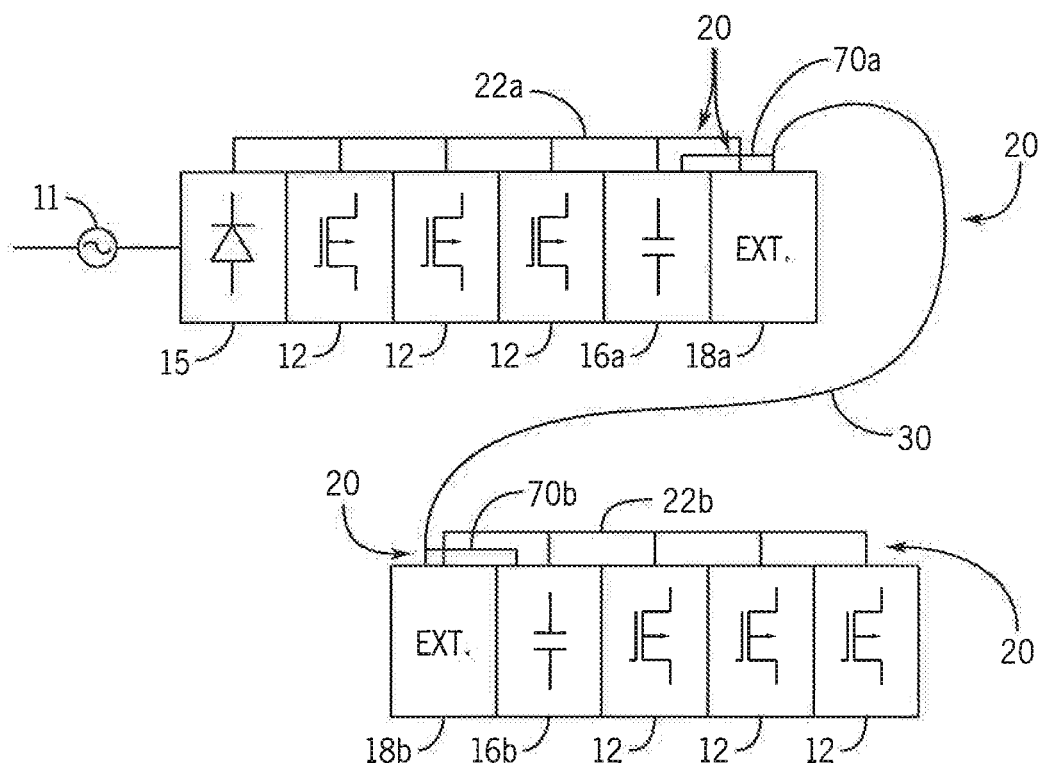
FIG. 9 is a block diagram representation of the second exemplary distributed motor drive system incorporating another embodiment of the invention.

In FIG. 9, a rectifier module 15 receives power from the AC source 11. Just as in the embodiment illustrated in FIG. 7, the AC source 11 may be a single phase or multi-phase AC source. The rectifier module 15 includes a set of diodes, forming a diode bridge, that rectifies the input power from the AC source 11 to a DC voltage on the shared DC bus 20. The rectifier module 15 conducts current only from the AC source 11 to the shared DC bus 20. The rectifier module 15 provides DC power to a first series of motor drives 12 via a first connector system 22a. A second series of motor drives are located remotely from the rectifier module 15 and the first series of motor drives 12. The remote location may be, for example, a second row within a control cabinet, a separate control cabinet, or a location proximate to a controlled axis of motion on a controlled machine or process. According to the embodiment illustrated in FIG. 9, however, an extension module 18 is added in parallel with the capacitance module 16. A first capacitance module 16a and a first extension module 18a are connected at the end of the first series of motor drives 12. A second extension module 18b and a second capacitance module 16b are connected at the start of the second series of motor drives 12. Each of the capacitance modules 16 and extension modules 18 includes a DC bus connector 100, and the DC bus connectors 100 on each capacitance module 16a, 16b is connected to the DC bus connector 100 of the respective extension module 18a, 18b by a flexible bus link 70. The DC power conducted on the first connector system 22a is conducted through the DC bus connector 100 on both the first capacitance module 16a and the first extension module 18a to the DC bus cable 30. Each end of the DC bus cable 30 is connected to the DC bus connector 100 on the first and second extension modules 18a, 18b. The power on the DC bus cable is then conducted to the second connector system 22b through the DC bus connector 100 on both the second extension module 18b and the second capacitance module 16b. The second connector system 22b conducts the DC power on the shared DC bus 20 to each of the motor drives 12 in the second series of motor drives. The above described configurations from FIGS. 6-9 are exemplary and for illustration. It is contemplated that still other configurations of DC bus power supplies, capacitance modules 16, extension modules 18, and motor drives 12 may be utilized without deviating from the scope of the invention.

Figure 11:
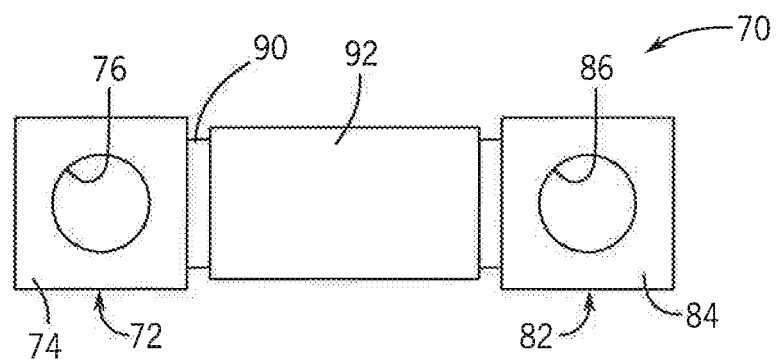
FIG. 11 is a top plan view of a flexible bus link utilized in one embodiment of the present invention.
Figure 12:
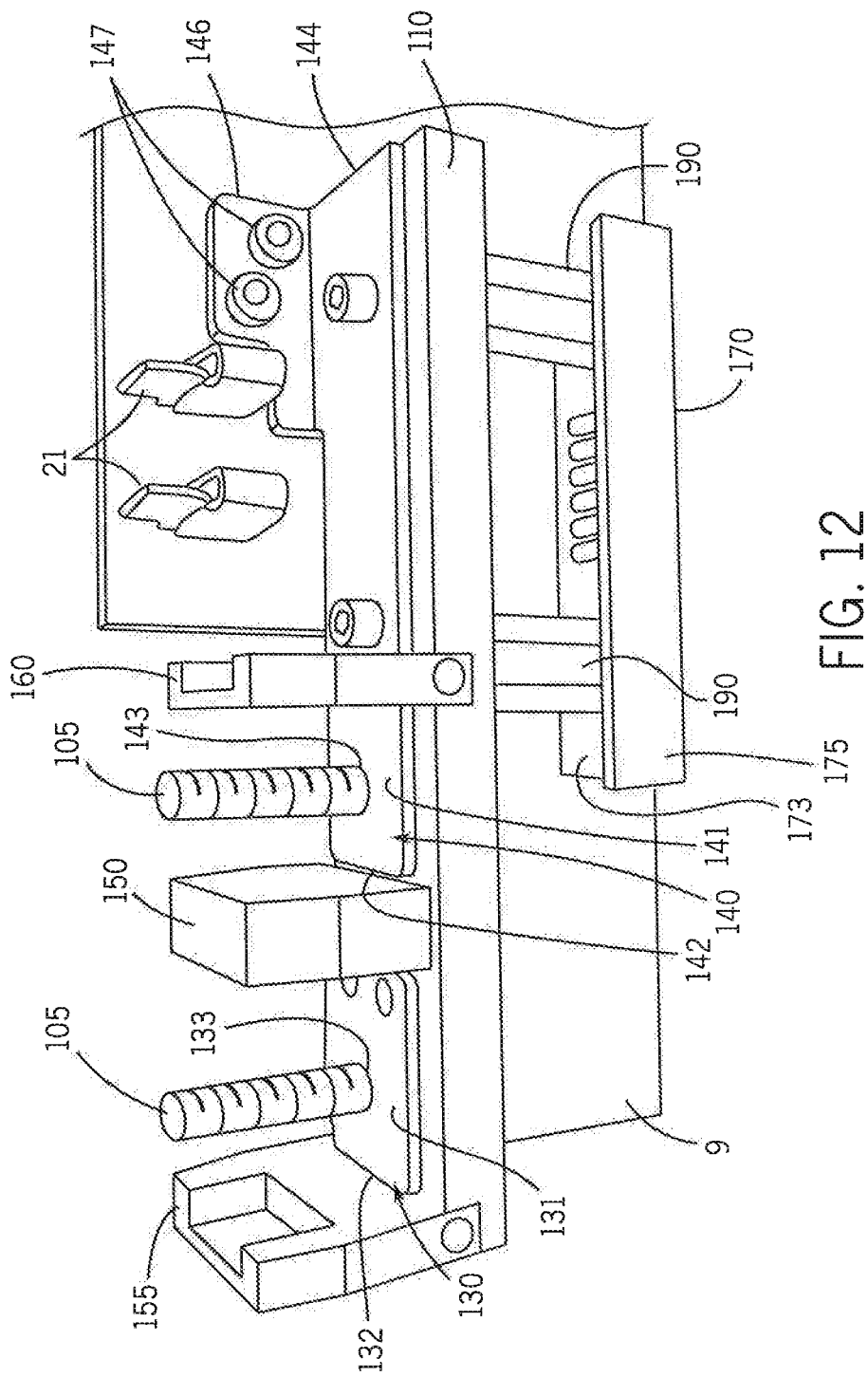
FIG. 12 is partial left side view of a DC bus connector utilized in the extension module from FIG. 1.
Figure 13:
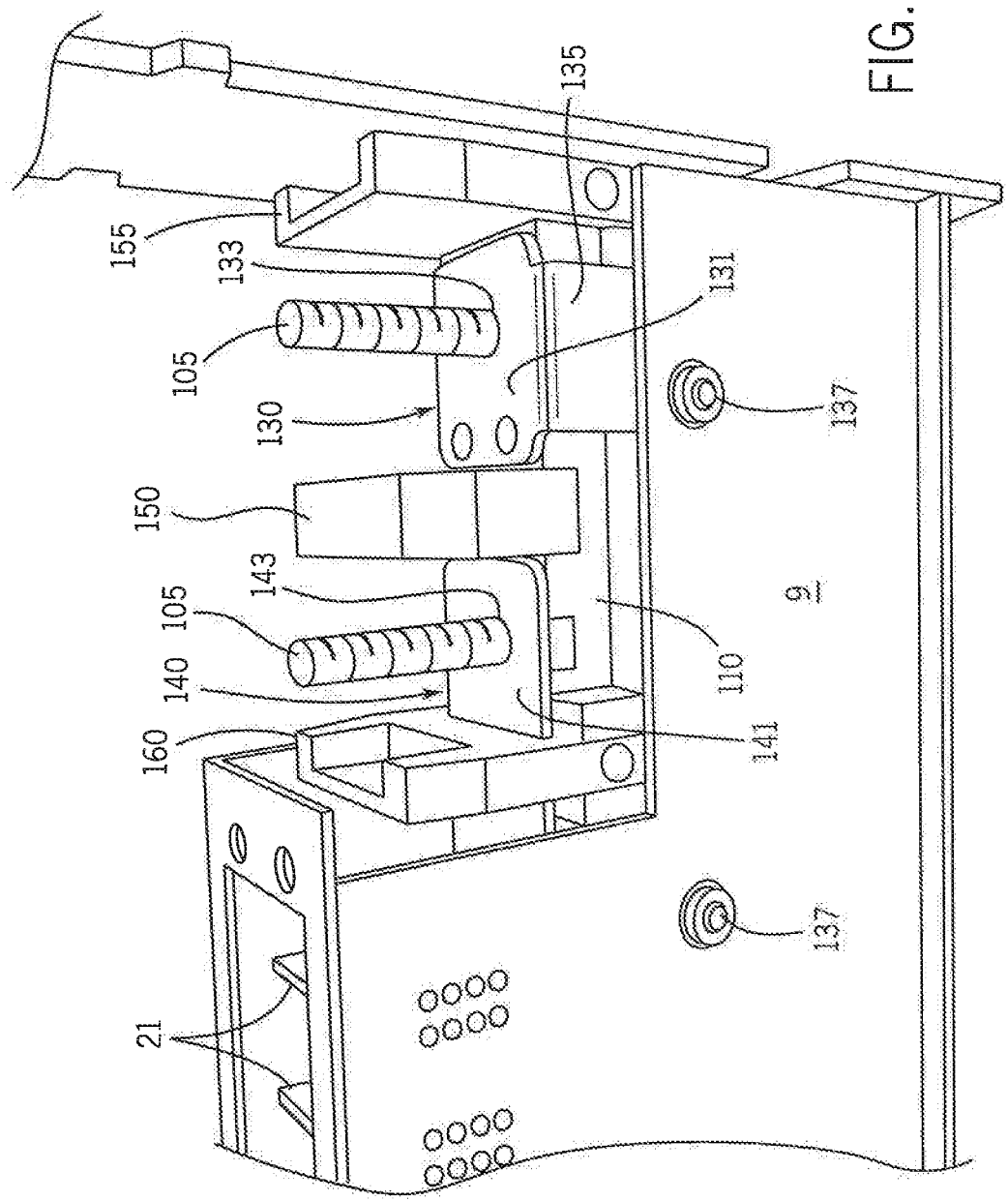
FIG. 13 is partial right side view of the DC bus connector utilized in the extension module from FIG. 1.
Figure 14:
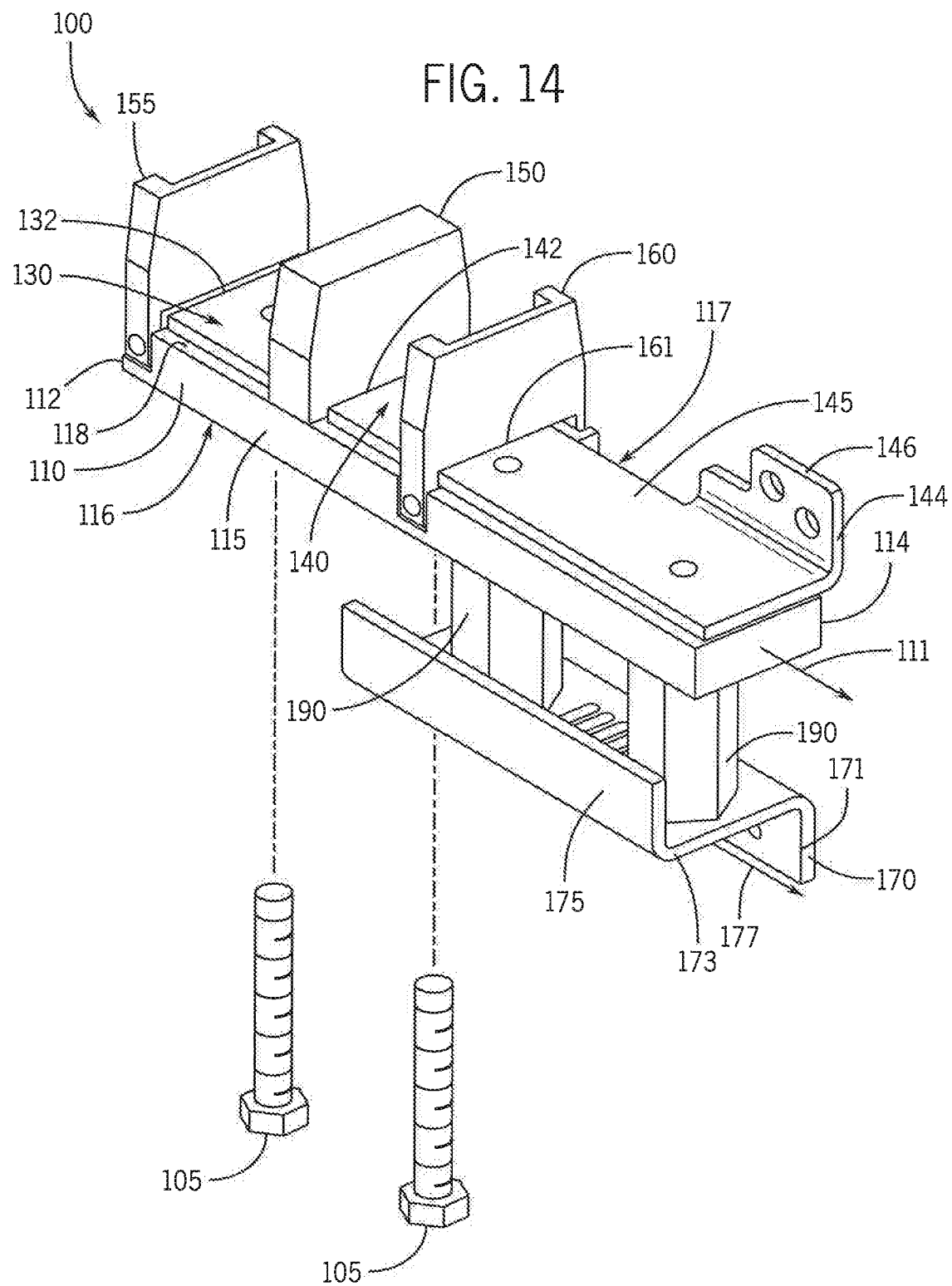
FIG. 14 is an exploded view of the DC bus connector of FIG. 12 from the top, front, and right side of the DC bus connector.
Figure 15:
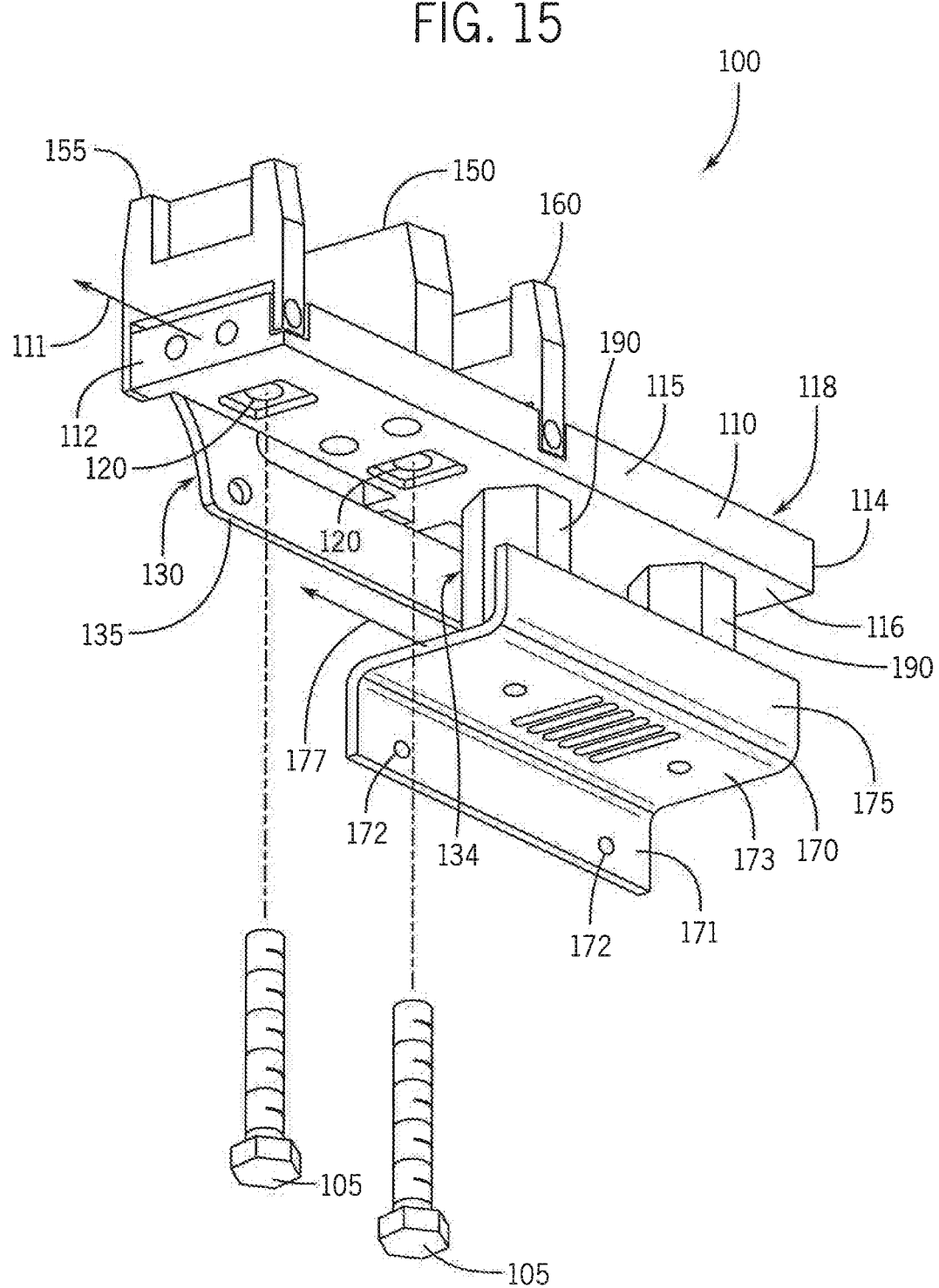
FIG. 15 is an exploded view of the DC bus connector of FIG. 12 from the bottom, rear, and right side of the DC bus connector.

Referring next to FIG. 11, one embodiment of a flexible bus link 70 includes a first lug 72 and a second lug 82 with a cable 90 extending therebetween. The first lug 72 has a generally planar surface 74 with an opening 76 extending through the middle. Similarly, the second lug 82 has a generally planar surface 84 with an opening 86 extending through the middle. Each of the first and second lugs 72, 82 are solid, conductive members. The cable 90 may be a flat, braided cable. The cable 90 has an insulating member 92 such as heat-shrink tubing enclosing the cable 90 between the lugs 72, 78. The cable 90 is connected to one edge of each of the first and second lugs 72, 82 by crimping, soldering or any other suitable method to obtain an electrical connection between the each lug 72, 82 and the cable 90. The opening 76, 86 in each lug 72, 82 is configured to pass over the threaded member 105 of the DC bus connector 100. Each lug 72, 82 may then be retained to the DC bus connector 100 by threading a nut onto the threaded member 105 and capturing the lug 72, 82 between the nut and the DC bus connector 100.

Turning next to FIGS. 12-15, a DC bus connector 100 according to one embodiment of the invention is illustrated. The DC bus connector 100 provides a physical connection for the DC bus cable 30 of the shared DC bus 20 and establishes an electrical connection between the DC bus cable 30 and a circuit board 9 on which the bus bar connector 27 is mounted. The DC bus connector 100 includes a longitudinal support member 110 having a first end 112 and a second end 114 opposite the first end 112. The longitudinal support member 110 also includes a lower surface 116, an upper surface 118, a right side 115, and a left side 117, each of which extends between the first end 112 and the second end 114, defining a generally rectangular bar. A pair of openings 120 extends through the longitudinal support member 110 proximate the first end 112 of the longitudinal support member 110. The diameter of each opening 120 is large enough to receive one of the mounting bolts 105 through the opening 120. Each mounting bolt 105 serves as one terminal on which one of the lugs 36, 38 from the DC bus cable 30 may be mounted. According to another embodiment of the invention, a pair of threaded rods may be molded within the longitudinal member to define the terminals for the DC bus cable 30. Optionally, still other configurations of terminals may be utilized as long as one mating connection is provided on the DC bus connector 100 and the complementary mating connection is provided on the end of each conductor 32, 24 of the DC bus cable 30. The longitudinal support member is made from an electrically insulating material such as epoxy.

The DC bus connector 100 further includes a first intermediate bus bar 130 and a second intermediate bus bar 140. The first intermediate bus bar 130 includes a first end 132 and a second end 134. The first end 132 of the first intermediate bus bar 130 includes a first planar mounting section 131 with an opening 133 extending therethrough. The first planar mounting section 131 of the first intermediate bus bar 130 is mounted to the upper surface 118 of the longitudinal support member 110 such that the opening 133 in the first planar mounting section 131 aligns with the opening 120 closest to the first end 112 of the longitudinal support member 110. A longitudinal segment 135 of the first intermediate bus bar 130 is connected to the first planar mounting section 131 and wraps around to the left side 117 of the longitudinal support member 110. The longitudinal segment 135 is generally orthogonal to the first planar mounting section 131 and extends toward but not fully to the second end 114 of the longitudinal support member 110. The longitudinal segment 135 of the first intermediate bus bar 130 runs generally parallel with and adjacent to the circuit board 9 within the capacitance module 16 or the extension module 18 in which it is mounted. At least one mounting screw 137 secures the longitudinal segment 135 of the first intermediate bus bar 130 to the circuit board 9. According to the embodiment illustrated in FIG. 13, two mounting screws 137 secure the longitudinal segment 135 to the circuit board 9. A trace on the circuit board 9 runs between the location at which the longitudinal segment 135 is connected and one of the DC bus stabs 21. The first intermediate bus bar 130 is formed from an electrically conductive material, such as copper and is preferably formed, for example, by stamping from a single piece of copper. Thus, the first intermediate bus bar 130 establishes an electrical connection between a first of the mounting bolts 105 and a first of the DC bus stabs 21.

The second intermediate bus bar 140 includes a first end 142 and a second end 144. The first end 142 of the second intermediate bus bar 140 includes a first planar mounting section 141 with an opening 143 extending therethrough. The first planar mounting section 141 of the second intermediate bus bar 140 is mounted to the upper surface 118 of the longitudinal support member 110 such that the opening 143 in the first planar mounting section 141 aligns with the opening 120 displaced furthest from the first end 112 of the longitudinal support member 110. A longitudinal segment 145 of the second intermediate bus bar 140 is connected to the first planar mounting section 141 and extends along the upper surface 118 of the longitudinal support member 110. The longitudinal segment 145 is generally coplanar with the first planar mounting section 141 and extends toward the second end 114 of the longitudinal support member 110. A second planar mounting section 146 for the second intermediate bus bar 140 extends generally orthogonal to the longitudinal segment 145 proximate the second end 114 of the longitudinal support member 110. The second planar mounting section 146 for the second intermediate bus bar 140 extends generally parallel with and adjacent to the circuit board 9 within the capacitance module 16 or the extension module 18 in which it is mounted. At least one mounting screw 147 secures the second planar mounting section 146 of the second intermediate bus bar 140 to the circuit board 9. According to the embodiment illustrated in FIG. 12, two mounting screws 147 secure the second planar mounting section 146 to the circuit board 9. A trace on the circuit board 9 runs between the location at which the second planar mounting section 146 is connected and one of the DC bus stabs 21. The second intermediate bus bar 140 is formed from an electrically conductive material, such as copper and is preferably formed, for example, by stamping from a single piece of copper. Thus, the second intermediate bus bar 140 establishes an electrical connection between a second of the mounting bolts 105 and a second of the DC bus stabs 21.

A central insulting member 150 is mounted to the upper surface 118 of the longitudinal support member 110. The central insulating member 150 is mounted between the first planar sections 131, 141 of the first and second intermediate bus bars 130, 140 and extends in a generally orthogonal direction from the upper surface 118 between each of the mounting bolts 105. A first side insulating member 155 is mounted proximate the first end 112 of the upper surface 118 of the longitudinal support member 110 and on the opposite side of the first planar section 131 of the first intermediate bus bar 130 from the central insulating member 150. The first side insulating member 155 extends in a direction generally orthogonal from the upper surface 118 of the longitudinal support member 110. A second side insulating member 160 is mounted along the upper surface 118 of the longitudinal support member 110 and on the opposite side of the first planar section 141 of the second intermediate bus bar 140 from the central insulating member 150. The second side insulating member 160 extends in a direction generally orthogonal from the upper surface 118 of the longitudinal support member 110. A space exists between a lower edge 161 of the second side insulating member and the upper surface 118 of the longitudinal support member 110 of sufficient thickness to allow the longitudinal segment 145 of the second intermediate bus bar 140 to pass through. Each of the insulating members 150, 155, 160 is made from an electrically insulating material, such as epoxy. The first side insulating member 155 and the central insulating member 150 are spaced a sufficient distance to permit the first lug 36 of the DC bus cable 30 to fit between the two members. The second side insulating member 160 and the central insulating member 150 are spaced a sufficient distance to permit the second lug 38 of the DC bus cable 30 to fit between the two members.

The DC bus connector 100 also includes a support member 170 to resist rotational forces applied to the DC bus connector 100 from the DC bus cable 30. According to the illustrated embodiment, an "s" shaped support member 170 is mounted to the longitudinal support member 110 via a pair of stand-offs 190. The support member 170 includes a first planar surface 171 oriented parallel and adjacent to the circuit board 9. A pair of openings 172 in the first planar surface 171 allows the support member 170 to be secured to the circuit board 9 by, for example, screws or bolts inserted through the openings 172 and through corresponding openings in the circuit board 9. It is not intended for the first planar surface 171 or for securing members, such as the screws or bolts, to provide an electrical connection between the support member 170 and the circuit board 9. The support member 170 may be made of an electrically conductive material, such as a metal, or an electrically non-conductive material, such as an epoxy or plastic. The outer layer of the circuit board 9 is a non-conductive substrate and traces on the circuit board 9 are routed around areas in which the support member 170 contacts the circuit board 9. The support member 170 further includes a second planar surface 173 and a third planar surface 175. The second planar surface 173 extends generally orthogonal to the first planar 171 surface away from the circuit board 9. The third planar surface 175 extends generally orthogonal to the second planar surface 173. A pair of standoffs 190 are mounted between the lower surface 116 of the longitudinal support member 110 and the second planar surface 173, such that an axis 111 extending through the longitudinal support member 110 would be offset from but generally parallel to an axis 177 extending through the second planar surface 173. Optionally, various other configurations of support members extending from the longitudinal support member 110 to the circuit board 9 may be utilized as long as the support member 110 is configured to resist forces applied to the wire terminals 105 from the DC bus cable 30.

Where upper and lower, front and rear, left and right, top and bottom, and other like terms denoting a direction are utilized herein, it is understood that the directions are relative to each other and do not denote an absolute direction. A device may be mounted in a reverse orientation such that the directions are similarly reversed without deviating from the scope of the invention.

In operation, the capacitance module 16 and the extension module 18 with their respective DC bus connectors 100 provide a system for increasing current capacity in a system having a shared DC bus 20. As previously indicated, a shared DC bus 20 may utilize both a DC bus cable 30 and a bus bar connector 27 to connect modules utilizing the shared DC bus 20. As the current rating of the shared DC bus 20 increases, the physical size of the DC bus cable 30 similarly increases in order to accommodate the increased current capacity. As the DC bus cable 30 increases in size, its weight increases and flexibility decreases. Thus, mounting the DC bus cable 30 to a wire terminal 105 results in increased force applied to the wire terminal 105 both from the weight and from the DC bus cable 30 protruding more rigidly from the side of the wire terminals. The DC bus connector 100 as disclosed herein is configured to support the DC bus cable 30 being connected to the corresponding wire terminals 105. According to one embodiment of the invention, the DC bus connector is configured to receive a first and second DC bus conductors 32, 24 rated to conduct 270 A.

A second problem also arises from an increase in the rating of the DC bus current. The current capacity between bus bar connectors 27 and the circuit board 9 is limited by the size of the traces on the circuit board 9. Increasing the current capacity of the bus bar connectors 27 would require an increase in the size of the bus bar connector 27 and, in particular to the footprint of the connection between the bus bar connector 27 and the circuit board 9. The capacitance module 16 and the extension module 18, each provided with the DC bus connector 100, provides a modular system where the capacitance module 16 may be utilized by itself or the capacitance module 16 and the extension module 18 may be utilized in a pair to double the current capacity of the shared DC bus 20.

Figure 10:
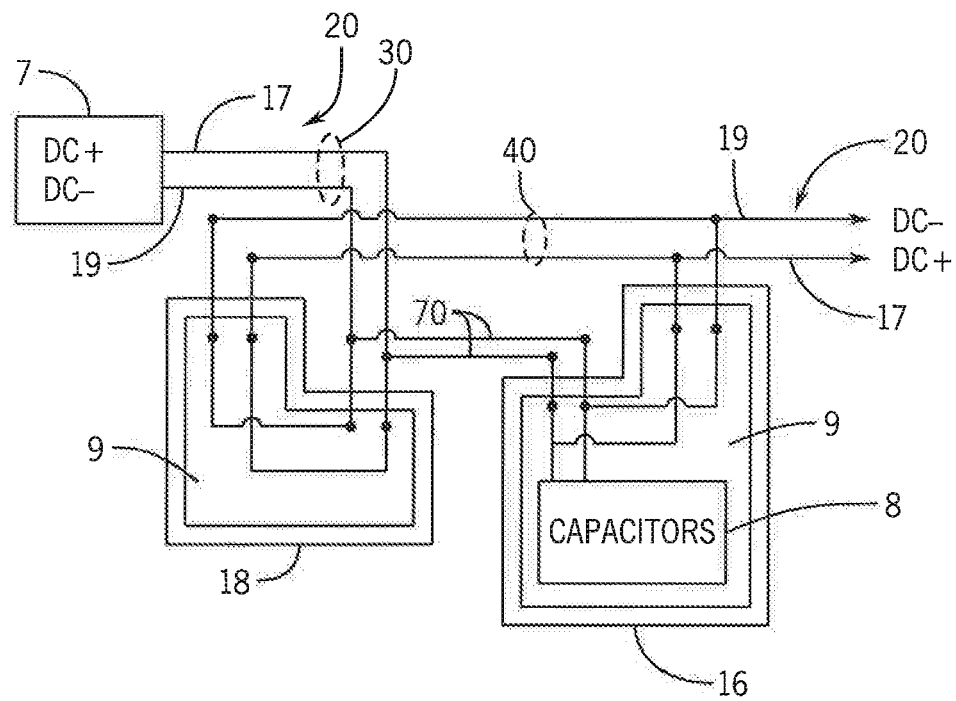
FIG. 10 is a schematic representation of the capacitance module and the extension module of FIG. 1.

With reference to FIG. 10, a DC power source 7, such as the regenerative module 13 or the rectifier module 15, provides DC power to the shared DC bus 20. A DC voltage potential is present between the positive rail 17 and the negative rail 19 of the DC bus 20. The first and the second DC bus conductors 32, 34 define the positive and negative rails 17, 19 of the shared DC bus 20 between the DC power source 7 and the extension module 18. Each of the first and the second DC bus conductors 32, 34 is sized to conduct at least 270 A of DC current. The first and the second DC bus conductors 32, 34 are connected to the wire terminals 105 of the DC bus connector 100 within the extension module 18. In addition, a first bus link 70 is connected between the first wire terminal 105 of the extension module 18 and the first wire terminal 105 of the capacitance module 16. A second bus link 70 is connected between the second wire terminal 105 of the extension module 18 and the second wire terminal 105 of the capacitance module 16. The current in the DC bus is split between each of the extension module 18 and the capacitance module 16 such that about 135 A of DC current is conducted through each module 16, 18. The DC current is conducted through the either the first or second wire terminal 105, intermediate bus bar 130, 140, trace on the circuit board 9, and bus bar connector 27, thereby establishing an electrical connection between each DC bus conductor 32, 34 and one of the DC bus bars 60. The capacitors 8 within the capacitance module 16 are connected in parallel across the traces on the circuit board 9 and are charged from the DC bus current conducted through the capacitance module. Bus bar assemblies 40 are inserted into each of the bus bar connectors 27 to conduct the DC bus current from the capacitance module 16 and the extension module 18 to each of the adjacent drive modules 12. The bus bar assemblies 40 are configured to conduct the full 270 A on the shared DC bus when the bus current output from each of the capacitance module 16 and the extension module 18 are recombined onto the shared DC bus 20.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An apparatus for reducing ripple current on a shared DC bus in a distributed motor drive system, wherein the distributed motor drive system includes a plurality of motor drives, each connected to the shared DC bus, and the DC bus includes a set of DC bus wires extending between at least a first portion of the plurality of motor drives and a second portion of the plurality of motor drives, the apparatus comprising:
   a first capacitance module mounted adjacent to the first portion of the plurality of motor drives, the first capacitance module including:
      a first set of terminals configured to receive a DC bus voltage via a first set of DC bus bars from a motor drive in the first portion of the plurality of motor drives,
      a second set of terminals configured to provide the DC bus voltage to the set of DC bus wires, and
      a first internal DC bus electrically connected in series between the first set of terminals and the second set of terminals; and
   a second capacitance module mounted adjacent to the second portion of the plurality of motor drives, the second capacitance module including:
      a third set of terminals configured to receive the DC bus voltage from the set of DC bus wires,
      a fourth set of terminals configured to provide the DC bus voltage to a motor drive in the second portion of the plurality of motor drives via a second set of DC bus bars, and
      a second internal DC bus electrically connected in series between the third set of terminals and the fourth set of terminals.

2. The apparatus of claim 1 wherein:
the first capacitance module includes a plurality of capacitors electrically connected between a first positive rail and a first negative rail of the first internal DC bus, and
the second capacitance module includes a plurality of capacitors electrically connected between a second positive rail and a second negative rail of the second internal DC bus.

3. The apparatus of claim 2 further comprising:
a first extension module mounted adjacent to the first capacitance module, the first extension module including:
a fifth set of terminals configured to receive the DC bus voltage via the first set of DC bus bars,
a sixth set of terminals configured to be connected with the second set of terminals via an extension cable and configured to provide the DC bus voltage to the set of DC bus wires, and
a third internal DC bus electrically connected between the fifth set of terminals and the sixth set of terminals.

4. The apparatus of claim 3 wherein a first portion of the plurality of motor drives is mounted to a first panel, the first capacitance module is mounted to the first panel adjacent to one of the first portion of the plurality of motor drives, and the first extension module is mounted to the first panel adjacent to the first capacitance module.

5. The apparatus of claim 3 further comprising:
a second extension module mounted adjacent to the second capacitance module, the second extension module including:
a seventh set of terminals configured to receive the DC bus voltage from the set of DC bus wires and configured to receive an extension cable extending between the seventh set of terminals and the third set of terminals,
an eighth set of terminals configured to be connected with the fourth set of terminals via the second set of DC bus bars, and
a fourth internal DC bus electrically connected between the seventh set of terminals and the eighth set of terminals.

6. The apparatus of claim 5 wherein:
a first portion of the plurality of motor drive is mounted to a first panel, the first capacitance module is mounted to the first panel adjacent to one of the first portion of the plurality of motor drives,
the first extension module is mounted to the first panel adjacent to the first capacitance module,
a second portion of the plurality of motor drive is mounted to a second panel, the second capacitance module is mounted to the second panel adjacent to one of the second portion of the plurality of motor drives, and
the second extension module is mounted to the second panel adjacent to the second capacitance module.

7. The apparatus of claim 5 wherein each of the first extension module and the second extension module include a DC bus connector, comprising:
a first wire terminal configured to receive a first DC bus wire from the set of DC bus wires and a second wire terminal configured to receive a second DC bus wire from the set of DC bus wires, wherein the first wire terminal and the second wire terminal define one of the sixth set of wire terminals and the eighth set of wire terminals;
an additional internal DC bus including a first intermediate bus bar and a second intermediate bus bar;
a circuit board on which one of the fifth set of terminals and the seventh set of terminals is mounted; and
a longitudinal support member having:
a first end and a second end opposite the first end, wherein the first wire terminal and the second wire terminal are mounted proximate to the first end of the longitudinal support member and one of the fifth set of terminals and the seventh set of terminals are proximate the second end of the longitudinal support member, and
an electrically insulating member mounted to the longitudinal support member between the first wire terminal and the second wire terminal, wherein:
each of the first and the second intermediate bus bars has a first end and a second end,
the first end of the first intermediate bus bar is mounted to the longitudinal support member and to the first wire terminal, establishing an electrical connection between the first wire terminal and the first intermediate bus bar,
the second end of the first intermediate bus bar is mounted to the circuit board and electrically connected to a first terminal selected from one of the fifth set of terminals and the seventh set of terminals via a first trace on the circuit board,
the first end of the second intermediate bus bar is mounted to the longitudinal support member and to the second wire terminal, establishing an electrical connection between the second wire terminal and the second intermediate bus bar, and
the second end of the second intermediate bus bar is mounted to the circuit board and electrically connected to a second terminal selected from one of the fifth set of terminals and the seventh set of terminals via a second trace on the circuit board.

8. The apparatus of claim 7 wherein the longitudinal support member defines a first axis extending along a length of the longitudinal support member and wherein the DC bus connector further comprises:
an additional support member mounted to the circuit board, wherein the additional support member defines a second axis displaced from the first axis in a plane generally parallel to the circuit board; and
at least one standoff mounted between the longitudinal support member and the additional support member.

9. The apparatus of claim 1 wherein each of the first capacitance module and the second capacitance module include a DC bus connector, comprising:
a first wire terminal configured to receive a first DC bus wire from the set of DC bus wires and a second wire terminal configured to receive a second DC bus wire from the set of DC bus wires, wherein the first wire terminal and the second wire terminal define one of the first set of wire terminals and the third set of wire terminals;
an additional internal DC bus including a first intermediate bus bar and a second intermediate bus bar;
a circuit board on which one of the second set of terminals and the fourth set of terminals is mounted; and
a longitudinal support member having:
a first end and a second end opposite the first end, wherein the first wire terminal and the second wire terminal are mounted proximate to the first end of the longitudinal support member and one of the second set of terminals and the fourth set of terminals are proximate the second end of the longitudinal support member, and an electrically insulating member mounted to the longitudinal support member between the first wire terminal and the second wire terminal, wherein:
   each of the first and the second intermediate bus bars has a first end and a second end,
   the first end of the first intermediate bus bar is mounted to the longitudinal support member and to the first wire terminal, establishing an electrical connection between the first wire terminal and the first intermediate bus bar,
   the second end of the first intermediate bus bar is mounted to the circuit board and electrically connected to a first terminal selected from one of the second set of terminals and the fourth set of terminals via a first trace on the circuit board,
   the first end of the second intermediate bus bar is mounted to the longitudinal support member and to the second wire terminal, establishing an electrical connection between the second wire terminal and the second intermediate bus bar, and
   the second end of the second intermediate bus bar is mounted to the circuit board and electrically connected to a second terminal selected from one of the second set of terminals and the fourth set of terminals via a second trace on the circuit board.

10. The apparatus of claim 9 wherein the longitudinal support member defines a first axis extending along a length of the longitudinal support member and wherein the DC bus connector further comprises:
   an additional support member mounted to the circuit board, wherein the additional support member defines a second axis displaced from the first axis in a plane generally parallel to the circuit board; and
   at least one standoff mounted between the longitudinal support member and the additional support member.

11. The apparatus of claim 9 further comprising:
a first insulated side member extending generally orthogonal to the longitudinal support member adjacent the first wire terminal; and
a second insulated side member extending generally orthogonal to the longitudinal support member adjacent the second wire terminal.

12. An apparatus for reducing ripple current on a shared DC bus in a distributed motor drive system, wherein the distributed motor drive system includes a plurality of motor drives, each connected to the shared DC bus, and the DC bus includes a set of DC bus wires extending between at least a first portion of the plurality of motor drives and a second portion of the plurality of motor drives, the apparatus comprising:
   a first module mounted proximate to the first portion of the plurality of motor drives, the first module including:
      a first set of terminals configured to receive a DC bus voltage via a first set of DC bus bars from a motor drive in the first portion of the plurality of motor drives,
      a second set of terminals configured to provide the DC bus voltage to the set of DC bus wires, and
      a first internal DC bus electrically connected in series between the first set of terminals and the second set of terminals; and
   a second module mounted proximate to the second portion of the plurality of motor drives, the second module including:
      a third set of terminals configured to receive the DC bus voltage from the set of DC bus wires,
      a fourth set of terminals configured to provide the DC bus voltage to a motor drive in the second portion of the plurality of motor drives via a second set of DC bus bars, and
      a second internal DC bus electrically connected in series between the third set of terminals and the fourth set of terminals.

13. The apparatus of claim 12 further comprising:
a third module mounted adjacent to the first module, the third module including:
   a fifth set of terminals configured to receive the DC bus voltage from the first set of terminals,
   a sixth set of terminals configured to be connected with the second set of terminals via a first extension cable and configured to provide the DC bus voltage to the set of DC bus wires, and
   a third internal DC bus electrically connected between the fifth set of terminals and the sixth set of terminals.

14. The apparatus of claim 13 wherein either the first module or the third module includes a plurality of capacitors electrically connected between a positive rail and a negative rail of either the first internal DC bus or the third internal DC bus, respectively.

15. The apparatus of claim 13 further comprising:
a fourth module mounted adjacent to the second module, the fourth module including:
   a seventh set of terminals configured to receive the DC bus voltage from the set of DC bus wires and configured to be connected with the third set of terminals via a second extension cable,
   an eighth set of terminals configured to be connected with the fourth set of terminals, and
   a fourth internal DC bus electrically connected between the seventh set of terminals and the eighth set of terminals.

16. The apparatus of claim 15 wherein either the second module or the fourth module includes a plurality of capacitors electrically connected between a positive rail and a negative rail of either the second internal DC bus or the fourth internal DC bus, respectively.

17. A DC bus connector system for distributed motor drives, the connector system comprising:
   a first set of DC bus bars defining a first portion of a shared DC bus, wherein the first portion of the shared DC bus supplies power to a first portion of distributed motor drives;
   a first module configured to be mounted proximate to the first portion of distributed motor drives, the first module including:
      a first set of terminals configured to receive a DC bus voltage from the first set of DC bus bars,
      a second set of terminals configured to be connected to a third set of terminals via a set of DC bus wires, and
      a first internal DC bus electrically connected in series between the first set of terminals and the second set of terminals;
   a second internal DC bus configured to be electrically connected between the third set of terminals and a fourth set of terminals; and
   a second set of DC bus bars defining a second portion of the shared DC bus, wherein:
      the second portion of the shared DC bus supplies power to a second portion of distributed motor drives,
      the first internal DC bus is configured to provide the DC bus voltage from the first set of terminals to the DC bus wires via the second set of terminals, the set of DC bus wires is configured to provide the DC bus voltage from the second set of terminals to the third set of terminals, and the second internal DC bus is configured to provide the DC bus voltage from the third set of terminals to the second set of DC bus bars via the fourth set of terminals.

18. The DC bus connector system of claim 17 further comprising a second module configured to be mounted proximate to the second portion of distributed motor drives, the second module including the third set of terminals, the fourth set of terminals, and the second internal DC bus.

19. The DC bus connector system of claim 18 further comprising a third module mounted adjacent to the first module, the third module including:

a fifth set of terminals configured to be connected with the first set of terminals, a sixth set of terminals configured to be connected with the second set of terminals via a first extension cable and configured to provide the DC bus voltage to the set of DC bus wires, and a third internal DC bus electrically connected between the fifth set of terminals and the sixth set of terminals.

20. The DC bus connector system of claim 19 further comprising a fourth module mounted adjacent to the second module, the fourth module including:

a seventh set of terminals configured to receive the DC bus voltage from the set of DC bus wires and configured to be connected with the third set of terminals via a second extension cable, an eighth set of terminals configured to be connected with the fourth set of terminals, and a fourth internal DC bus electrically connected between the seventh set of terminals and the eighth set of terminals.

\* \* \* \* \*